United States Patent [19]

Shimomura et al.

[11] Patent Number: 4,871,805

[45] Date of Patent: Oct. 3, 1989

[54] POLYPROPYLENE COMPOSITION

[75] Inventors: Yozo Shimomura, Ichiharashi; Kinya Mori, Chibashi; Osamu Kojima, Ichiharashi, all of Japan

[73] Assignee: Chisso Corporation, Osaka, Japan

[21] Appl. No.: 122,741

[22] Filed: Nov. 19, 1987

[30] Foreign Application Priority Data

Dec. 19, 1986 [JP] Japan ................... 61-302985

[51] Int. Cl.$^4$ ................... C08L 53/02; C08L 23/12; C08L 23/16; C08L 23/06
[52] U.S. Cl. ................... 525/98
[58] Field of Search ................... 525/98

[56] References Cited

U.S. PATENT DOCUMENTS

| | | | |
|---|---|---|---|
| 3,299,174 | 1/1967 | Kuhre et al. | 260/876 |
| 3,700,633 | 10/1972 | Wald et al. | 260/880 B |
| 3,793,283 | 2/1974 | Frailey et al. | 525/98 |
| 4,178,328 | 12/1979 | Thiruvillakkat | 525/98 |
| 4,634,735 | 1/1987 | Thiersault et al. | 525/88 |

FOREIGN PATENT DOCUMENTS 58-210950 12/1983 Japan .
2114581 8/1983 United Kingdom .

*Primary Examiner*—Carman J. Seccuro
*Attorney, Agent, or Firm*—Fred Philpitt

[57] ABSTRACT

A polypropylene composition capable of producing molded products having superior stiffness, impact resistance, transparency, resistance to whitening on impact on bending and luster is provided, which composition has (i) a styrene-ethylene·butylene-styrene block copolymer or a styrene-ethylene·propylene block copolymer each in 5 to 30% by weight based on the weight of the composition, blended with a highly crystalline propylene homopolymer (A) having a relationship between its isotactic pentad ratio (P) and melt flow rate (MFR) represented by an expression of $$1.00 \geq P \geq 0.015 \log \text{MFR} + 0.955;$$

(ii) a styrene-ethylene·butylene-styrene block copolymer or a styrene-ethylene·propylene block copolymer each in 5 to 30% by weight based on the weight of the composition and an ethylene-propylene copolymer rubber or a polyethylene each in 15% by weight based thereon, blended with the above (A), the blending proportion of (A) being 60% by weight or more based on the weight of the composition; or (iii) a styrene-ethylene·butylene-styrene block copolymer or a styrene-ethylene·propylene block copolymer, each in 5 to 30% by weight based on the weight of the composition, an ethylene-propylene rubber and polyethylene each in 15% by weight or less based thereon, blended with the above (A), the blending proportion of (A) being 60% by weight or more based thereon.

3 Claims, No Drawings

POLYPROPYLENE COMPOSITION

BACKGROUND OF THE INVENTION 1. Field of the Invention

This invention relates to a polypropylene composition. More particularly it relates to a polypropylene composition affording, when molded, molded products having superior stiffness, transparency, impact resistance, resistance to whitening on impact, resistance to whitening on bending, luster, etc. 2. Description of the Related Art Propylene homopolymer resins are relatively cheap and provided with physical properties satisfying performances required in the market; hence they have been broadly used as general-purpose resins in various molding fields such as film molding field, injection molding field, extrusion molding field, blow molding field, extrusion-stretching molding field, etc.

However, molded products obtained from the propylene homopolymer resins have a drawback that they are inferior in the impact resistance. In order to overcome this drawback, various compositions have so far been developed such as compositions obtained by blending an elastomer such as ethylene-propylene copolymer rubber, styrene-butadiene copolymer, etc. or propylene-ethylene block copolymer with propylene homopolymer, or compositions obtained by using propylene-ethylene block copolymer in place of propylene homopolymer. Further, in order to improve the transparency and impact resistance of propylene homopolymer, there has been developed a propylene polymer resin composition obtained by blending with a crystalline propylene polymer resin selected from among propylene homopolymer, propylene-α-olefin random copolymers and mixtures of the foregoing, a styrene-ethylene-butylene block copolymer in a quantity of 5 to 60% by weight based on the total weight of both the components (Japanese patent application laid-open No. Sho 58-210950/1983).

However, as to the polypropylene composition obtained by blending an ethylene-propylene copolymer rubber or a propylene-ethylene block copolymer with propylene homopolymer, when a molded product is obtained from the composition, the molded product is improved in the impact resistance, but drawbacks are instead raised that the molded product becomes white-turbid, its transparency is damaged and its resistance to whitening on impact and stiffness are notably lowered.

Further, compositions obtained by replacing propylene homopolymer by propylene-α-olefin block copolymers are effective for improving the impact resistance of molded products obtained from the compositions, but drawbacks are instead raised that the resulting molded products become white-turbid, their transparency is damaged and the stiffness and luster of the surface of the molded products are notably lowered. Further, in the fields of large size molded products whose molding materials have been being converted into plastics in recent years, such as fields of large size interior parts for automobiles, e.g. rear quarter panel, industrial large size panel, pallet, large size battery case, etc., the molded products have a large self-weight and a long fixing span so that problems of deformation of the molded products such as the surging phenomenon, warpage, shell blister, etc. of the products, and further, problems of insufficient firm feeling of the molded products and injury and abrasion of the surface of the molded products due to insufficient stiffness thereof also have caused a narrow bottleneck of commercialization of the molded products. Thus it is practically difficult to use a composition obtained from a propylene-α-olefin block copolymer which exhibits only a flexural modulus of about 10,000 Kg f/cm$^2$, for producing large size molded products as described above, and also the thus obtained molded products are inferior in the transparency and surface luster.

In order to improve the stiffness, compositions obtained by blending an inorganic filler such as talc with propylene homopolymer or propylene-α-olefin copolymers have been developed, but while the stiffness is improved, the impact resistance and surface luster are reduced and the resistance to whitening on impact and the resistance to whitening on bending are also not improved; hence it is utterly impossible to use them for producing the above-mentioned large size molded products.

Further, the composition disclosed in the above-mentioned Japanese patent application laid-open No. Sho 58-210950/1983 is effective for improving the impact resistance and transparency of molded products obtained from the composition, but the stiffness thereof is notably reduced; hence it is difficult to use the composition for producing large size molded products as described above.

The present inventors have made extensive research for developing a polypropylene composition capable of being also used for producing large size molded products. As a result, we have found that a composition obtained by blending a styrene-ethylene butylene-styrene block copolymer (a copolymer consisting of polystyrene block, ethylene-butylene random copolymer block and polystyrene block) or a styrene-ethylene propylene block copolymer (copolymer consisting of polystyrene block and ethylene-propylene random copolymer block), each in a definite quantity with a specified propylene homopolymer or a composition obtained by further adding an ethylene-propylene copolymer rubber and/or a polyethylene each in a definite quantity with the abovementioned composition is superior in the stiffness (12,000 Kg f/cm$^2$ or more in terms of flexural modulus), impact resistance (6 Kg f-cm/cm or more in terms of Izod impact strength) and transparency (50% or less in terms of haze value), and can afford molded products having a superior resistance to whitening on impact, resistance to whitening on bending and surface luster, and have completed the present invention based on this finding.

SUMMARY OF THE INVENTION

As apparent from the foregoing, the object of the present invention is to provide a polypropylene composition from which molded products having a high stiffness and superior impact resistance, transparency, resistance to whitening on impact, resistance to whitening on bending and luster can be produced.

The present invention resides in the following constitutions:

(1) A polypropylene composition having a styrene-ethylene butyrene-styrene block copolymer or a styrene-ethylene propylene block copolymer each in 5 to 30% by weight based on the weight of said composition, blended with a highly crystalline propylene homopolymer having a relationship between its isotactic pentad ratio (P) and melt flow rate (MFR) represented by an expression of $$1.00 \geq P \geq 0.015 \log MFR + 0.955.$$

(2) A polypropylene composition having a styrene-ethylene butylene-styrene block copolymer or a styrene-ethylene propylene block copolymer each in 5 to 30% by weight based on the weight of said composition and an ethylene-propylene copolymer rubber or a polyethylene each in 15% by weight or less based thereon, blended with a highly crystalline propylene homopolymer having a relationship between its isotactic pentad ratio (P) and melt flow rate (MFR) represented by an expression of $$1.00 \geq P \geq 0.015 \log MFR + 0.955,$$

the blending proportion of said highly crystalline propylene homopolymer being 60% by weight or more based on the weight of said composition.

(3) A polypropylene composition having a styrene-ethylene butylene-styrene block copolymer or a styrene-ethylene propylene block copolymer each in 5 to 30% by weight based on the weight of said composition, an ethylene-propylene copolymer rubber in 15% by weight or less based thereon and a polyethylene in 15% by weight or less based thereon, blended with a highly crystalline propylene homopolymer having a relationship between its isotactic pentad ratio (P) and melt flow rate (MFR) represented by an expression of $$1.00 \geq P \geq 0.015 \log MFR + 0.955,$$

the blending proportion of said highly crystalline propylene homopolymer being 60% by weight or more based on the weight of said composition.

DETAILED DESCRIPTION OF PREFERRED EMBODIMENTS

The propylene homopolymer used in the present invention refers to a highly stiff polypropylene having a relationship between its isotactic pentad ratio (P) and melt flow rate (MFR) represented by an expression of $1.00 \geq P \geq 0.015 \log MFR + 0.955$. Such a propylene homopolymer may be produced e.g. according to a process disclosed in Japanese patent application laid-open No. Sho 58-104907/1983. Namely, it can be obtained by reacting an organoaluminum compound such as triethylaluminum, diethylaluminum chloride, etc. or a reaction product of the above organoaluminum compound with an electron donor such as diisoamyl ether, etc. with $TiCl_4$ to obtain a solid product (I), followed by further reacting this product with the above electron donor and an electron acceptor such as $TiCl_4$ to obtain a solid product (II), combining an organoaluminum compound and an aromatic carboxylic acid ester (III) such as methyl p-toluylate with the solid product (II) and polymerizing propylene in the presence of a catalyst consisting of the aromatic carboxylic acid ester and the solid product (II) in a molar ratio (III/II) of 0.2 to 10.0. The isotactic pentad ratio (P) referred to herein means an isotactic fraction in terms of pentad units contained in a polypropylene molecular chain, measured according to a method announced by A. Zambelli et al in Macromolecules, 6, 925 (1973), i.e. using 13C-NMR (nuclear magnetic resonance method). Namely the isotactic pentad ratio (P) refers to a fraction of five propylene monomer units isotactically linked in series in the total propylene monomer units. The determination method of the attribution of obtained peaks in the above NMR measurement is carried out according to the method described in Macromolecules, 8, 687 (1975). Further, the measurement of the isotactic pentad ratio of the present invention according to NMR was carried out employing an apparatus of 270 $MH_z$ Fourier transform NMR, and by raising the signal detection limit up to 0.001 in terms of isotactic pentad ratio, through integral measurement of 27,000 times.

The measurement of the melt flow rate (MFR) was carried out according to the method described in JIS K 6758 (temperature 230° C., load 2.16 Kg f).

The blending ratio of the propylene homopolymer is in the range of 95 to 60% by weight, preferably 90 to 70% by weight based on the total weight of the composition. If the ratio is less than 60% by weight, the stiffness of molded products obtained from the resulting composition lowers.

The styrene-ethylene butylene-styrene block copolymer (hereinafter abbreviated to "SEBS") and the styrene-ethylene.propylene block copolymer (hereinafter abbreviated to "SEP") refer to rubbery substance obtained according to a known method e.g. Japanese patent publication No. Sho 60-57463/1985, and such SEBS and SEP are commercially available (e.g. Kraton G1650, G1652, G1657, G1701, etc., trademarks of products manufactured by Shell Chemical Company).

The blending proportions of SEBS or SEP each are in the range of 5 to 30% by weight, preferably 10 to 20% by weight based on the weight of the composition. If the proportion is less than 5% by weight, it is impossible to obtain effects of improving the transparency and impact resistance, while if it exceeds 30% by weight, not only the stiffness but the mechanical strength and processability are reduced.

The ethylene-propylene copolymer rubber (hereinafter abbreviated to "EPR") used in the present invention refers to those having an ethylene content of 65 to 85% by weight and a Mooney viscosity ($M_{L1+4}{}^{100}$) of about 10 to 100 and commercially available products may be used as the rubber such as EP-OIP, EP-O2P, EP-O7P and EP-57P, trademarks of products manufactured by Japan Synthetic Rubber Company, Ltd., TAFMER-PO680, TAFMER-P0280, TAFMER-P0480 and TAFMER-P0180, trademarks of products manufactured by MITSUI PETROCHEMICAL INDUSTRIES, Ltd., P-1253, P-1240, P-1239, P-1241 and P-1242, tradenames of products manufactured by Sumitomo Chemical Company, Limited , etc.

The blending proportion of the EPR is 15% by weight or less, preferably in the range of 5 to 10% by weight based on the weight of the composition. If the proportion exceeds 15% by weight, the impact resistance of molded products obtained from the resulting composition are improved, whereas the molded products become white-turbid, their transparency is lost and their stiffness is notably reduced.

The polyethylene (hereinafter abbreviated to PE) used in the present invention refers to general-purpose polymers obtained according to conventional process, and may be suitably chosen from among commercially available high density PE, linear low density PE and low density PE.

The melt index of the PE used (the quantity of the resin melt extruded at 190° C. under a load of 2.16 Kg f for 10 minutes) has no particular limitation, but those of 1 to 50g/10 min. are preferred.

The blending proportion of the PE is 15% by weight or less, preferably in the range of 5 to 10% by weight based on the weight of the composition. If the proportion exceeds 15% by weight, molded products obtained from the resulting composition become white-turbid and their transparency is reduced.

To the composition of the present invention may be suitably added, if necessary, various additives usually added to polypropylene such as nucleating agents, antioxidants, heat stabilizers, antistatic agents, UV absorbers, metal deactivators (copper deactivators) coloring agents, etc. Further, to the composition of the present invention may also be added other additive components such as inorganic fillers e.g. talc, calcium carbonate, glass fibers, mica, etc., flame retardants, flame retardant auxiliaries, etc. In particular, addition of nucleating agent is preferred since the stiffness is improved without damaging the transparency.

The composition of the present invention may be produced by introducing definite quantities of the respective blending components into a blending means such as Henschel mixer (tradename), super mixer, etc., blending them with stirring for a few minutes, e.g. 3 minutes, melt-kneading the resulting blend by means of rolls, Banbury mixer (trademark), Ko-kneader (trademark), single or twin screw extruder or the like at a melt-kneading temperature of 180° to 300° C., preferably 200° to 260° C. and pelletizing the resulting extrudate. The thus produced composition of the present invention is subjected to production of molded products according to various molding processes such as injection molding process, extrusion molding process, blow molding process, etc. in accordance with the object.

The molded products obtained from the composition of the present invention are superior in the stiffness, impact resistance, transparency, resistance to whitening on impact, resistance to whitening on bending and luster and provided with well-balanced characteristics. In particular, the molded products have far higher stiffness and impact resistance than those of molded products obtained from compositions comprising as a base polymer, a polymer selected from among propylene-α-olefin block copolymers, propylene-α-olefin random copolymers and mixtures of the foregoing, and also are provided with superior luster, resistance to whitening on impact, resistance to whitening on bending and transparency, these superior characteristics being impossible to achieve in the case of compositions comprising propylene-α-olefin block copolymers. Thus it is possible to suitably apply the composition of the present invention to various application fields, particularly fields where superior luster, transparency, resistance to whitening on impact and resistance to whitening on bending have been intensely required, for example, fields of various packaging materials, vessels, parts for appliances, parts for automobiles, etc. Further, since the composition of the present invention can be molded into molded products having a high stiffness, it can be suitably applied to various molded products such as not only small or middle size molded products e.g. caps for cosmetics, binders, video cassette case, etc., but also large size molded products e.g. interior parts for automobiles e.g. rear quarter panel, etc., industrial large size panel, pallet, large size battery case, etc.

The present invention will be concretely described by way of Examples and Comparative examples. In addition, the evaluation methods employed in Examples and Comparative examples are as follows:

(1) Stiffness

Stiffness was evaluated by measuring flexural modulus according to JIS K 7203.

(2) Impact resistance

Impact resistance was evaluated by measuring Izod impact strength according to JIS K 7110.

(3) Transparency

As the evaluation method of transparency, the following two methods were employed:

(i) Measurement of haze

Haze was measured according to ASTM D 1003.

(ii) Visual evaluation

A flat sheet of 50 mm long, 50 mm wide and 2 mm thick was molded according to an injection molding method, and using this sheet as a test piece, transparency evaluation by visual observation ( sight through test) was carried out according to the following standards:

◉ : very good

◯ : good

Δ: somewhat inferior x: white-turbid; sight through is entirely impossible.

(4) Resistance to whitening on impact

A flat sheet of 50 mm long, 50 mm wide and 2 mm thick was molded and used as a test piece. An impacting body of 700 g weight having a tip end of 6.35 mm R was dropped from a height of 1 m at 23° C. and the extent of the resulting whitened spot of the test piece was evaluated by visual observation. The resistance to whitening on impact was judged according to the following standards:

◉ : whitened spot of diameters less than 5 mm

◯ : whitened spot of diameters of 5 to less than 10 mm

Δ: whitened spot of diameters of 10 to less than 20 mm x: whitened spot of diameters of 20 mm or more (5) Resistance to whitening on bending A flat sheet of 25 mm long, 50 mm wide and 1 mm thick was molded and this sheet was used as a test piece. The test piece was bent by 90° and the resulting whitened spot of bent portion of the test piece was judged by visual observation. The standards of this test were as follows:

◉ : whitening is scarcely observed

◯ : whitening is somewhat observed

Δ: whitening is observed x: whitening is notable.

Luster: measurement of percentage of luster (according to JIS Z 8741)

Measured at an angle of incidence of 60°.

(7) Overall evaluation

◯ : the case satisfying all the following values and evaluations: the value of flexural modulus is 12,000 Kg f/cm² or more; the value of Izod impact strength is 6 Kg f-cm/cm or more; the haze value is 50% or less; the evaluations of sight through test, resistance to whitening on impact and resistance to whitening on bending are all ◯; and the value of luster is 87 or more.

x: the case where the above-mentioned standard values and evaluations are not satisfied even in any one of the above-mentioned items.

EXAMPLES 1-4 AND COMPARATIVE EXAMPLES 1-7

A propylene homopolymer (CHISSO POLYPRO K5016, trademark of a product manufactured by Chisso Corporation) having a melt flow rate (MFR) of 5 g/10 min. and an isotactic pentad ratio (P) of 0.98 as a specified propylene homopolymer and Kraton G-1652 (trademark of a product manufactured by Shell Chemical Company)as an SEPS or Kraton G-1701 (trademark of a product manufactured by Shell Chemical Company) as an SEP were blended in blending proportions indicated later in Table 1, followed by mixing them with stirring by means of Henschel mixer (tradename) for 5 minutes, and melt-kneading-extruding the mixture by means of a single screw extruder at a melt-kneading temperature of 220° C. to obtain a composition in the form of pellets.

Further, in Comparative examples 1–7, pellets were obtained using the following polymers or compositions:

pellets of a propylene-ethylene block copolymer (1) (P-E block copolymer (1)) having an MFR of 3 g/10 min. and an ethylene content of 8.5% by weight (CHISSO POLYPRO K 7014, trademark of a product manufactured by Chisso Corporation)—Comparative example 1;

pellets of a conventional propylene homopolymer having an MFR of 10 g/10 min. and an isotactic pentad ratio (P) of 0.93 (CHISSO POLYPRO K 1008, trademark of a product manufactured by Chisso Corporation)—Comparative example 2;

pellets of a propylene-ethylene block copolymer (2) (P-E block copolymer (2)) having an MFR of 3 g/10 min. and an ethylene content of 12% by weight (CHISSO POLYPRO K 7714, trademark of a product manufactured by Chisso Corporation)—Comparative example 3;

pellets of a propylene-ethylene random copolymer (P-E random copolymer) having an MFR of 10 g/10 min. and an ethylene content of 2.5% by weight (CHISSO POLYPRO K 4028, trademark of a product manufactured by Chisso Corporation)—Comparative example 4; and pellets obtained by blending the respective blending components indicated in Table 1 in the respective blending proportions indicated therein, followed by mixing with stirring and melt-kneading-extruding in the same manner as in Examples 1–4—Comparative examples 5–7.

The respective pellets of the above Examples and Comparative examples were molded into test pieces having a definite shape according to injection molding process at a resin temperature of 250° C., and these pellets were subjected to evaluations of flexural modulus, Izod impact strength, percentage of luster, transparency, resistance to whitening on impact, and resistance to whitening on bending and also to overall evaluation. The results are shown in Table 1.

EXAMPLE 5 AND 6 AND COMPARATIVE EXAMPLES 8–12

The same propylene homopolymer as that used in Example 1–4 as a specified propylene homopolymer, the same Kraton G-1652 as that used in Examples 1–4 as an SEBS, EP-02P having a Mooney viscosity ($M_{L1+4}{}^{100}$) of 24 and an ethylene content of 74% by weight and an MFR of 3.5 g/10 min. (trademark of a product manufactured by Japan Synthetic Rubber Company, Ltd.) as an EPR and an ethylene homopolymer having an MFR of 5 and a density of 0.964 (CHISSO POLYETHY M850, trademark of a product manufactured by Chisso Corporation) as a PE were blended in blending proportions indicated later in Table 2, followed by mixing with stirring and melt-kneading-extruding in the same manner as in Examples 1–4 to obtain compositions in the form of pellets.

Further, in Comparative examples 8–12, the respective blending components indicated later in Table 2 in proportions indicated therein were blended, followed by mixing with stirring and melt-kneading-extruding in the same manner as in Examples 1–4 to obtain compositions in the form of pellets.

The respective pellets obtained in these Examples and Comparative examples were molded into test pieces in the same manner as in Examples 1–4 and these pieces were subjected to evaluations of flexural modulus, Izod impact strength, percentage of luster, resistance to whitening on impact, and resistance to whitening on bending and also to overall evaluations. The results are shown in Table 2.

EXAMPLES 7–9 AND COMPARATIVE EXAMPLE 13

The same propylene homopolymer as that used in Examples 1–4 as a specified propylene homopolymer, the same Kraton G-1652 as that used in Examples 1–4 as an SEBS, Kraton G-1701 as an SEP, EP-02P as an EPR and CHISSO POLYETHY M 850 as a PE were blended in blending proportions indicated in Table 2, followed by mixing with stirring and melt-kneading-extruding in the same manner as in Examples 1–4 to obtain compositions in the form of pellets.

The respective pellets obtained in the above Examples and Comparative example were molded into test pieces, and these pieces were subjected to evaluations of flexural modulus, Izod impact strength, percentage of luster, transparency, resistance to whitening on impact and resistance to whitening on bending and also to overall evaluations. The results are shown in Table 2.

TABLE 1

| | | Example | | | | Comparative example | | | | | | |
|---|---|---|---|---|---|---|---|---|---|---|---|---|
| | Tradename | 1 | 2 | 3 | 4 | 1 | 2 | 3 | 4 | 5 | 6 | 7 |
| | | % by weight | | | | | | | | | | |
| Specified P homopolymer | K5016 | 95 | 85 | 75 | 85 | 0 | 0 | 0 | 0 | 55 | 0 | 0 |
| Usual P homopolymer | K1008 | 0 | 0 | 0 | 0 | 0 | 100 | 0 | 0 | 0 | 75 | 85 |
| SEBS | Kraton G-1652 | 5 | 15 | 25 | 0 | 0 | 0 | 0 | 0 | 45 | 25 | 0 |
| SEP | Kraton G-1701 | 0 | 0 | 0 | 15 | 0 | 0 | 0 | 0 | 0 | 0 | 15 |
| EPR | EP-02P | 0 | 0 | 0 | 0 | 0 | 0 | 0 | 0 | 0 | 0 | 0 |
| PE | M850 | 0 | 0 | 0 | 0 | 0 | 0 | 0 | 0 | 0 | 0 | 0 |
| P-E block copolymer - (1) | K7014 | 0 | 0 | 0 | 0 | 100 | 0 | 0 | 0 | 0 | 0 | 0 |
| P-E block copolymer - (2) | K7714 | 0 | 0 | 0 | 0 | 0 | 0 | 100 | 0 | 0 | 0 | 0 |
| P-E random copolymer | K4028 | 0 | 0 | 0 | 0 | 0 | 0 | 0 | 100 | 0 | 0 | 0 |
| Flexural modulus | 23° C. (kg f/cm²) | 21,000 | 18,000 | 14,000 | 17,000 | 11,500 | 14,000 | 10,000 | 11,500 | 8,500 | 10,000 | 11,000 |

TABLE 1-continued

|  |  | Example | | | | Comparative example | | | | | | |
| --- | --- | --- | --- | --- | --- | --- | --- | --- | --- | --- | --- | --- |
|  |  | 1 | 2 | 3 | 4 | 1 | 2 | 3 | 4 | 5 | 6 | 7 |
| Izod impact strength | 23° C. (kg · cm/cm) | 6 | >30 | >30 | 16 | 14 | 30 | 18 | 4 | >33 | >30 | 14 |
| Haze | (%) | 40 | 36 | 34 | 40 | 90 | 48 | 93 | 34 | 33 | 35 | 65 |
| Sight through test | — | ⊚ | ⊚ | ⊚ | ○ | X | | X | ⊚ | ⊚ | ⊚ | Δ |
| Resistance to whitening on impact | — | ⊚ | ⊚ | ⊚ | ○ | X | X | X | Δ | ⊚ | ⊚ | ○ |
| Resistance to whitening on bending | — | ⊚ | ⊚ | ⊚ | ○ | X | X | X | Δ | ⊚ | ⊚ | ○ |
| Percentage of luster | (%) | 92 | 93 | 95 | 93 | 73 | 90 | 70 | 100 | 95 | 93 | 85 |
| Overall evaluation | — | ○ | ○ | ○ | ○ | X | X | X | X | X | X | X |

Note
(P homopolymer: propylene homopolymer)

TABLE 2

|  |  | Example | | Comparative example | | | | | | Example | | | Comp. ex. |
| --- | --- | --- | --- | --- | --- | --- | --- | --- | --- | --- | --- | --- | --- |
|  |  | 5 | 6 | 8 | 9 | 10 | 11 | 12 | 7 | 8 | 9 | 13 | |
|  | Tradename | % by weight | | | | | | | | | | | |
| Specified P homopolymer | K5016 | 80 | 80 | 95 | 75 | 0 | 70 | 70 | 75 | 75 | 75 | 75 |
| Usual P homopolymer | K1008 | 0 | 0 | 0 | 0 | 85 | 0 | 0 | 0 | 0 | 0 | 0 |
| SEBS | Kraton G-1652 | 10 | 10 | 0 | 0 | 0 | 10 | 10 | 10 | 10 | 0 | 10 |
| SEP | Kraton G-1701 | 0 | 0 | 0 | 0 | 0 | 0 | 0 | 0 | 0 | 10 | 0 |
| EPR | EP-02P | 10 | 0 | 5 | 25 | 15 | 20 | 0 | 10 | 5 | 5 | 5 |
| PE | M850 | 0 | 10 | 0 | 0 | 0 | 0 | 20 | 5 | 10 | 10 | 20 |
| P-E block copolymer - (1) | K7014 | 0 | 0 | 0 | 0 | 0 | 0 | 0 | 0 | 0 | 0 | 0 |
| P-E block copolymer - (2) | K7714 | 0 | 0 | 0 | 0 | 0 | 0 | 0 | 0 | 0 | 0 | 0 |
| P-E random copolymer | K4028 | 0 | 0 | 0 | 0 | 0 | 0 | 0 | 0 | 0 | 0 | 0 |
| Flexural modulus | 23° C. (kg f/cm$^2$) | 18,500 | 18,000 | 20,000 | 13,000 | 11,500 | 11,500 | 15,500 | 18,500 | 18,000 | 16,000 | 16,500 |
| Izod impact strength | 23° C. (kg · cm/cm) | 18 | 15 | 6 | >30 | — | >30 | 25 | 12 | 12 | >30 | 13 |
| Haze | (%) | 44 | 48 | 55 | 75 | 70 | 52 | 81 | 44 | 50 | 43 | 60 |
| Sight through test | — | ○ | ○ | X | X | X | Δ | X | ○ | ○ | ○ | X |
| Resistance to whitening on impact | — | ○ | ○ | X | X | X | X | ○ | ⊚ | ⊚ | ○ | ○ |
| Resistance to whitening on bending | — | ○ | ○ | X | X | X | X | ○ | ⊚ | ⊚ | ○ | ○ |
| Percentage of luster | (%) | 89 | 90 | 92 | 87 | 91 | 90 | 85 | 92 | 91 | 93 | 89 |
| Overall evaluation | — | ○ | ○ | X | X | X | X | X | ○ | ○ | ○ | X |

Note
(P homopolymer: propylene homopolymer)

What we claim is:

1. A polypropylene composition having a styrene-ethylene butylene-styrene block copolymer or a styrene-ethylene propylene block copolymer each in 5 to 30% by weight based on the weight of said composition, blended with a highly crystalline propylene homopolymer having a relationship between its isotactic pentad ratio (P) and melt flow rate (MFR) represented by an expression of $$1.00 \geq P \geq 0.015 \log MFR + 0.955.$$

2. A polypropylene composition having a styrene-ethylene butylene-styrene block copolymer or a styrene-ethylene propylene block copolymer each in 5 to 30% by weight based on the weight of said composition and an ethylene-propylene copolymer rubber or a polyethylene each in 15% by weight or less based thereon, blended with a highly crystalline propylene homopolymer having a relationship between its isotactic pentad ratio (P) and melt flow rate (MFR) represented by an expression of $$1.00 \geq P \geq 0.015 \log MFR + 0.955,$$

the blending proportion of said highly crystalline propylene homopolymer being 60% by weight or more based on the weight of said composition.

3. A polypropylene composition having a styrene-ethylene butylene-styrene block copolymer or a styrene-ethylene propylene block copolymer each in 5 to 30% by weight based on the weight of said composition, an ethylene-propylene copolymer rubber in 15% by weight or less based thereon and a polyethylene in 15% by weight or less based thereon, blended with a highly crystalline propylene homopolymer having a relationship between its isotactic pentad ratio (P) and melt flow rate (MFR) represented by an expression of $$1.00 \geq P \geq 0.015 \log MFR + 0.955,$$

the blending proportion of said highly crystalline propylene homopolymer being 60% by weight or more based on the weight of said composition.

* * * * *